United States Patent
Wihlidal et al.

(10) Patent No.: US 11,568,572 B2
(45) Date of Patent: *Jan. 31, 2023

(54) TEXTURE COMPRESSION

(71) Applicant: Electronic Arts Inc., Redwood City, CA (US)

(72) Inventors: Graham Wihlidal, Stockholm (SE); John Hable, Los Angeles, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/189,813

(22) Filed: Mar. 2, 2021

(65) Prior Publication Data
US 2021/0256734 A1 Aug. 19, 2021

Related U.S. Application Data

(63) Continuation of application No. 16/059,979, filed on Aug. 9, 2018, now Pat. No. 10,970,880.

(51) Int. Cl.
*G06K 9/00* (2022.01)
*G06T 9/00* (2006.01)
(Continued)

(52) U.S. Cl.
CPC ............... *G06T 9/00* (2013.01); *G06T 15/04* (2013.01); *H04N 19/103* (2014.11); *H04N 19/176* (2014.11); *H04N 19/189* (2014.11)

(58) Field of Classification Search
CPC ......... G06T 9/00; G06T 15/04; H04N 19/103; H04N 19/176; H04N 19/189; H04N 19/154; H04N 19/91; H04N 19/40
(Continued)

(56) References Cited

U.S. PATENT DOCUMENTS

2008/0002896 A1    1/2008  Lu et al.
2008/0055331 A1*   3/2008  Iourcha ............... H04N 19/119
                                                375/E7.176
(Continued)

OTHER PUBLICATIONS

Reed, Nathan, Understanding BCn Texture Compression Formats, Nathan Reed's Coding Blog, Feb. 12, 2012, 17 Pages, Retrieved from http://reedbeta.com/blog/understanding-bcn-texture-compression-formats/.

(Continued)

*Primary Examiner* — Huy C Ho
(74) *Attorney, Agent, or Firm* — Gray Ice Higdon (57) ABSTRACT

A computer-implemented method comprises receiving a first compressed representation of a texture map in a first compression format, wherein the first compressed representation has been compressed using a first compressor, and receiving an array of compression parameters for a second compressor, the array of compression parameters including one or more respective compression parameters for each of a plurality of pixel regions of the texture map. The method further comprises decompressing the first compressed representation of the texture map to obtain the texture map, and compressing, using the second compressor, the texture map to a second compressed representation in a second compression format, comprising compressing each of said plurality of pixel regions of the texture map in accordance with the respective one or more compression parameters. The method further comprises storing the second compressed representation of the texture map to one or more memories accessible by a graphics processing unit, and selectively decompressing portions of the second compressed representation of the texture map using the graphical processing unit.

20 Claims, 7 Drawing Sheets

(51) Int. Cl.
*H04N 19/103* (2014.01)
*H04N 19/176* (2014.01)
*G06T 15/04* (2011.01)
*H04N 19/189* (2014.01)

(58) Field of Classification Search
USPC .......................................................... 382/239
See application file for complete search history.

(56) References Cited

U.S. PATENT DOCUMENTS

| | | | |
|---|---|---|---|
| 2008/0198925 A1 | 8/2008 | Sayre | |
| 2009/0074308 A1* | 3/2009 | Sasaki | H04N 19/426 382/232 |
| 2015/0262385 A1* | 9/2015 | Satoh | H04N 19/44 345/582 |

OTHER PUBLICATIONS

Microsoft, Texture Block Compression in Direct3D 11, Microsoft-Windows Dev Center, May 30, 2018, 4 pages, Retrieved from https://docs.microsoft.com/en-us/windows/desktop/direct3d11/texture-block-compression-in-direct3d-11.

Lichtenbelt, Barthold et al., ARB Texture Compression BPTC, ARB, Jun. 6, 2016, 14 pages, Retrieved from: https://www.khronos.org/registry/OpenGL/extensions/ARB/ARB_texture_compression_bptc.txt.

Wikipedia, JPEG, Wikipedia The Free Encyclopedia, Feb. 1, 2019, 29 pages, Retrieved from: https://en.wikipedia.org/wiki/JPEG.

Wikipedia, JPEG 2000, Wikipedia The Free Encyclopedia, Jan. 7, 2019, 17 pages, Retrieved from: https://en.wikipedia.org/wiki/JPEG_2000.

* cited by examiner

TEXTURE COMPRESSION

FIELD OF THE INVENTION

The present invention relates to image compression, and in particular to systems and methods for compressing texture maps.

BACKGROUND

Modern texture block compression formats, such as BC7 and BC6H, achieve high-quality image data compression by providing a wide range of compression modes and compressing each pixel block with the most appropriate mode. The resulting compressed data may be stored on a persistent storage device where it can be quickly accessed as needed by applications.

SUMMARY

In accordance with a first aspect, this specification describes a computer-implemented method which includes receiving a first compressed representation of a texture map in a first compression format, wherein the first compressed representation has been compressed using a first compressor. An array of compression parameters is received for a second compressor, the array of compression parameters including one or more respective compression parameters for each of a plurality of pixel regions of the texture map. The method further comprises decompressing the first compressed representation of the texture map to obtain the texture map, and compressing, using the second compressor, the texture map to a second compressed representation in a second compression format, comprising compressing each of said plurality of pixel regions of the texture map in accordance with the respective one or more compression parameters. The second compressed representation of the texture map is stored to one or more memories accessible by a graphics processing unit, and portions of the second compressed representation of the texture map are selectively decompressed using the graphical processing unit.

In accordance with a second aspect, the specification describes a computer-implemented method comprising receiving a texture map and compressing the texture map, using a first compressor, to a first compressed representation of the texture map in a first compression format. An array of compression parameters is generated for a second compressor, comprising determining, for each of a plurality of pixel regions of the texture map, one or more respective compression parameters which optimize compression of the pixel region into a compressed representation in a second compression format using the second compressor. The first compressed representation of the texture map is stored in association with the array of compression parameters for the second compressor.

In accordance with a third aspect, this specification describes a computer-readable persistent storage medium comprising: a compressed representation of a texture map in a first compression format; and an array of compression parameters associated with the texture map, wherein the array of compression parameters includes one or more respective compression parameters for each of a plurality of pixel regions of the texture map, wherein each of the one or more compression parameter are usable to optimize compression of the corresponding pixel region into a compressed representation in a second compression format.

BRIEF DESCRIPTION OF THE DRAWINGS

Certain embodiments of the present invention will now be described, by way of example, with reference to the following figures.

DETAILED DESCRIPTION

Example implementations provide system(s) and method(s) for improved handling of texture maps, e.g. for video game applications. For example, systems and methods described herein may reduce the persistent storage needed to store a texture map, and the time, computational resources and memory to transform a texture map into a block compression format on-the-fly.

In accordance with various example implementations, the compression mode for each pixel block in an image is determined in advance and stored in a block compression mode array. This block compression mode array is stored alongside a conventionally (e.g. JPEG2000) compressed version of the image. When the image is needed by an application requiring a block compressed representation, e.g. a 3D renderer, the JPEG2000 compressed version of the image is decompressed. Then the decompressed image is efficiently recompressed into the respective modern block compression format using the stored block compression mode array.

The JPEG2000 version of the image can be represented with significantly less data than the block compressed version. Hence, significantly less persistent storage is required to store the JPEG2000 version of the image than the block compressed version. Therefore, the present invention enables less persistent storage to be used while still presenting the image to applications in a block compressed format, thus permitting selective access to regions of the compressed data for applications such as graphics rendering.

The described system is particularly advantageous in the context of video games. Many modern video games have a vast number of high-quality textures. By reducing the amount of persistent storage required to store these textures, the described system can greatly reduce the overall storage requirement for such video games. Moreover by reducing the amount of data needed to represent textures, in accordance with various implementations described in this specification, significant improvements may be made in network download sizes, game installation times and loading times.

Storage System

Figure 1:
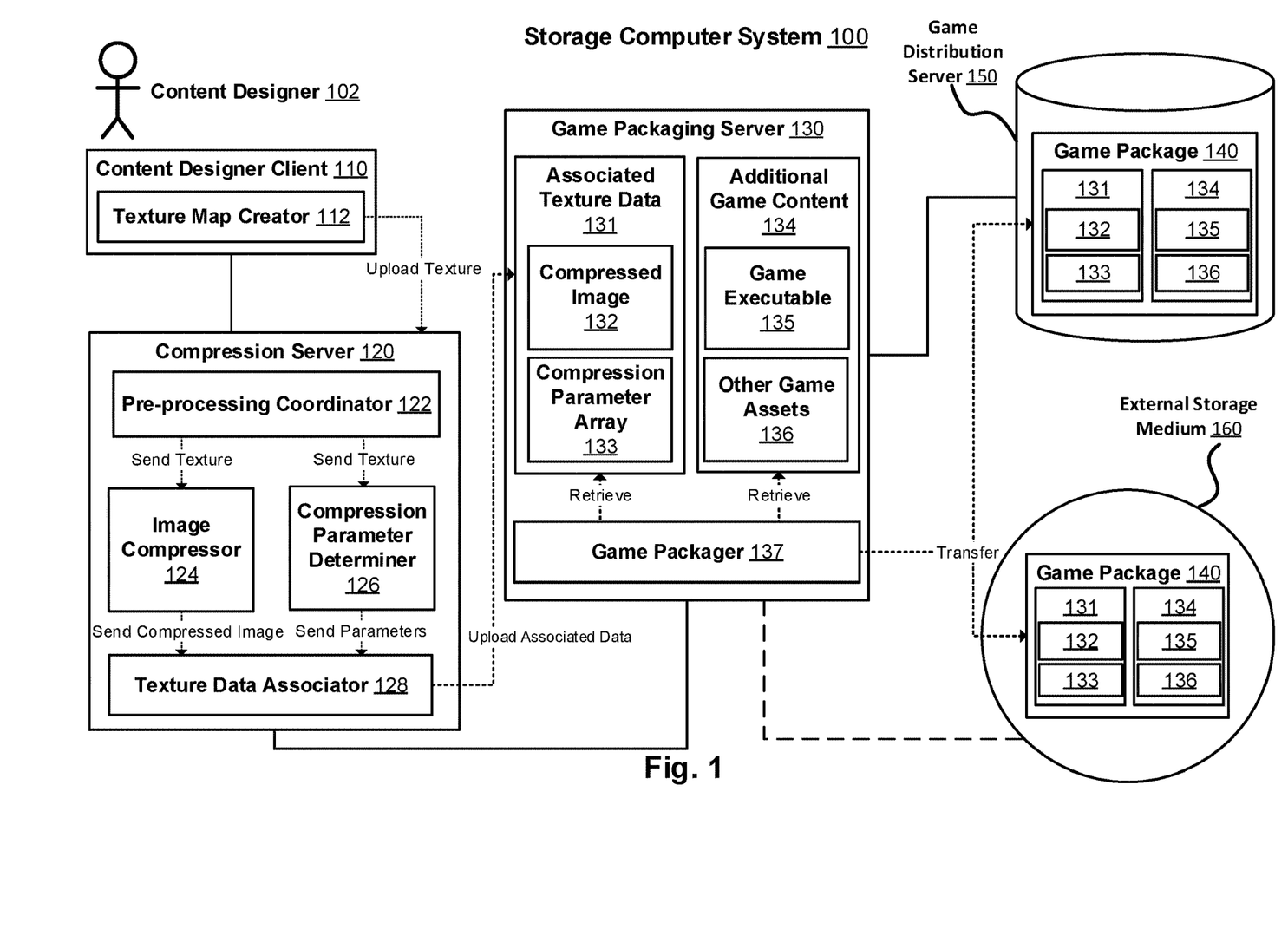
FIG. 1 is a schematic block diagram illustrating an example of a computer system configured to generate and store associated texture data based on a texture map.

Referring to FIG. 1, a storage system 100 for generating and storing associated texture data representing a texture map is shown.

The storage system 100 includes a content designer client computing device 110 operable by a content designer 102, a compression server 120, a game packaging server 130 and either or both of a game distribution server 150 and an external storage medium 160. The content designer client computing device 110 is configured to communicate with the compression server 120 over a network. Similarly, the compression server is configured to communicate with the game packaging server 130, and, if present, the game distribution server 150, over the same or another network. Examples of suitable networks include the internet, intranets, local area networks, wireless networks and cellular networks. For the sake of clarity, the storage system 100 is described as comprising a specific number of computing devices. Any of these may be collocated on a single computing device. For example, two or more of the servers 120, 130 and 150 may be located on a single shared server. Alternatively, one or more of the servers could be distributed across a number of computing devices.

The content designer client computing device 110 can be any computing device suitable for providing the texture map creator computer program 112 to the content designer 102. For example, the client computing device 110 may be any of a laptop computer, desktop computer or tablet computer. For displaying the graphical user interfaces of computer programs to the content designer 102, the client computing device 110 includes or is connected to a display (not shown). Input device(s) (not shown) are also included or connected to the client. Examples of suitable input devices include keyboards, touchscreens and mice.

The content designer computing device 110 provides a texture map creator computer program(s) 112 to the content designer 102. The texture map creator computer program(s) 112 is any computer program, or group of associated computer programs, capable of being used by the content designer 102 to create a texture map and upload, or otherwise send, the texture map to the compression server 120. For example, the texture map creator computer program 112 may be an image editing program capable of creating a texture map and providing, via a plugin or integrally, functionality to upload a texture to the compression server 120. Alternatively, where the texture map creator computer programs 112 are a group of associated computer programs, the group may comprise a conventional image editing program and a distinct uploading computer program. The texture map may be uploaded to the compression server 120 in any suitable format. For maximal quality, the texture map is typically uploaded to the compression server 120 in an uncompressed or losslessly compressed format, e.g. PNG or TIFF.

Each server 120, 130, 150 includes one or more processors (not shown), a memory (not shown) and a network interface (not shown). The processor(s) of each server execute suitable instructions stored in a computer-readable medium, e.g. memory. The network interface of each server is used to communicate with the other components of the system 100 to which the server is connected.

The compression server 120 provides a pre-processing coordinator 122, an image compressor 124, a compression parameter determiner 126 and a texture data associator 128.

The pre-processing coordinator 122 receives the uploaded texture map. If necessary, the pre-processing coordinator 122 decompresses the received texture map and/or removes extraneous data to obtain raw pixel data. The pre-processing coordinator then provides this raw pixel data to an image compressor 124 and a compression parameter determiner 126.

The image compressor 124 also receives the raw pixel data from the pre-processing coordinator. The image compressor 124 compresses the pixel data as a unit to a compressed image 132 in a conventional image compression format, such as JPEG or JPEG-2000. One example of how such compression may be performed is provided with respect to method 220 of FIG. 3. The compressed image 132 is sent to the texture data associator 128.

The compression parameter determiner 126 also receives the raw pixel data. The compression parameter determiner 126 is responsible for determining one or more suitable compression parameters for each pixel region in the raw pixel data, to produce a compression parameter array 133. The pixel regions may be blocks, e.g. 4×4 blocks, and the compression parameters may be parameters for a suitable texture block compression format, e.g. BC7 or BC6H. The compression parameters for each pixel region are determined as to be usable by a texture compressor, e.g. a BC7 or BC6H compressor, to optimise compression of each respective pixel region. The determined compression parameters may include a compression mode. The determined compression parameters may additionally include mode-specific parameters. The compression parameter array 133 is sent to the texture data associator 128.

To produce the compression parameter array, the compression parameter determiner 126 may first segment the raw pixel data in to the pixel regions, e.g. 4×4 blocks. For each of these regions, the compression parameter determiner 126 may determine the respective compression parameters according to a suitable method, e.g. method 230 of FIG. 4.

The texture data associator 128 then receives the conventionally compressed image 131 and compression parameter array 133. The texture data associator 128 associates these to produce associated texture data 131. The conventionally compressed image 132 and compression parameter array 133 may be associated in any of a variety of ways. For instance, the conventionally compressed image 132 and compression parameter array 133 may be combined in the same archive file, e.g. a TAR or ZIP file, or simply be located in the same folder. Alternatively, an association between them may be stored in a suitably structured file or database where each row contains a reference to a pixel region of a given conventionally compressed image, and a reference to the one or more compression parameters for that pixel region in the compression parameter array 133. Having produced the associated texture data 131, the texture data associator uploads the associated texture data 131 to the game packaging server 130.

The game packaging server 130 stores both the uploaded associated texture data 131 and additional game content 134. The game packaging server also provides a game packager 137.

The additional game content 134 includes the game executable 135 and other game assets 136. The game executable 135 includes computer-readable instructions to run a video game computer program for performance by a processor and GPU of a gaming device, e.g. a personal computer, a games console or a smart phone. These computer-readable instructions define computations and logical operations used by the game, and also contain operations to load resources such as the associated texture data 131 and/or the other game assets 136.

The other game assets 136 are other data necessary for running the game. Examples of such data include markup-language files, scripts, images and music.

The game packager 137 retrieves the associated texture data 131 and additional game content 134, and integrates them into a game package 140. The game package 140 may be a losslessly compressed archive, e.g. a Zip or 7z file or a compressed tar archive. The game package 140 may also be an installer or archive configured for use by a particular gaming platform. For instance, the gaming platform may be any of PC, Mac, Xbox One, PlayStation 4 or Nintendo Switch.

The game packager 137 then transfers the game package 140 to either or both of a game distribution server 150 and an external storage medium 160. The external storage medium 160 may be any suitable external storage medium, e.g. an optical disc or a game cartridge.

In the case of transfer to the game distribution server 150, the game package 140 is transferred over the network from the packaging server 140 to the game distribution server 150. Examples of suitable game distribution servers include file servers for game distribution services such as Origin, developed by Electronic Arts.

In the case of transfer to an external storage medium 160, the game package 140 is written to the game storage medium 160 using an appropriate peripheral. Where the external storage medium 160 is an optical disc, such as a Blu-ray disc, the game package 140 may be transferred to the disc using a disc drive with writing capability. Where the external storage medium 160 is a game cartridge, the game package may be transferred using a specialised cartridge writing peripheral.

Storage Method

Figure 2:
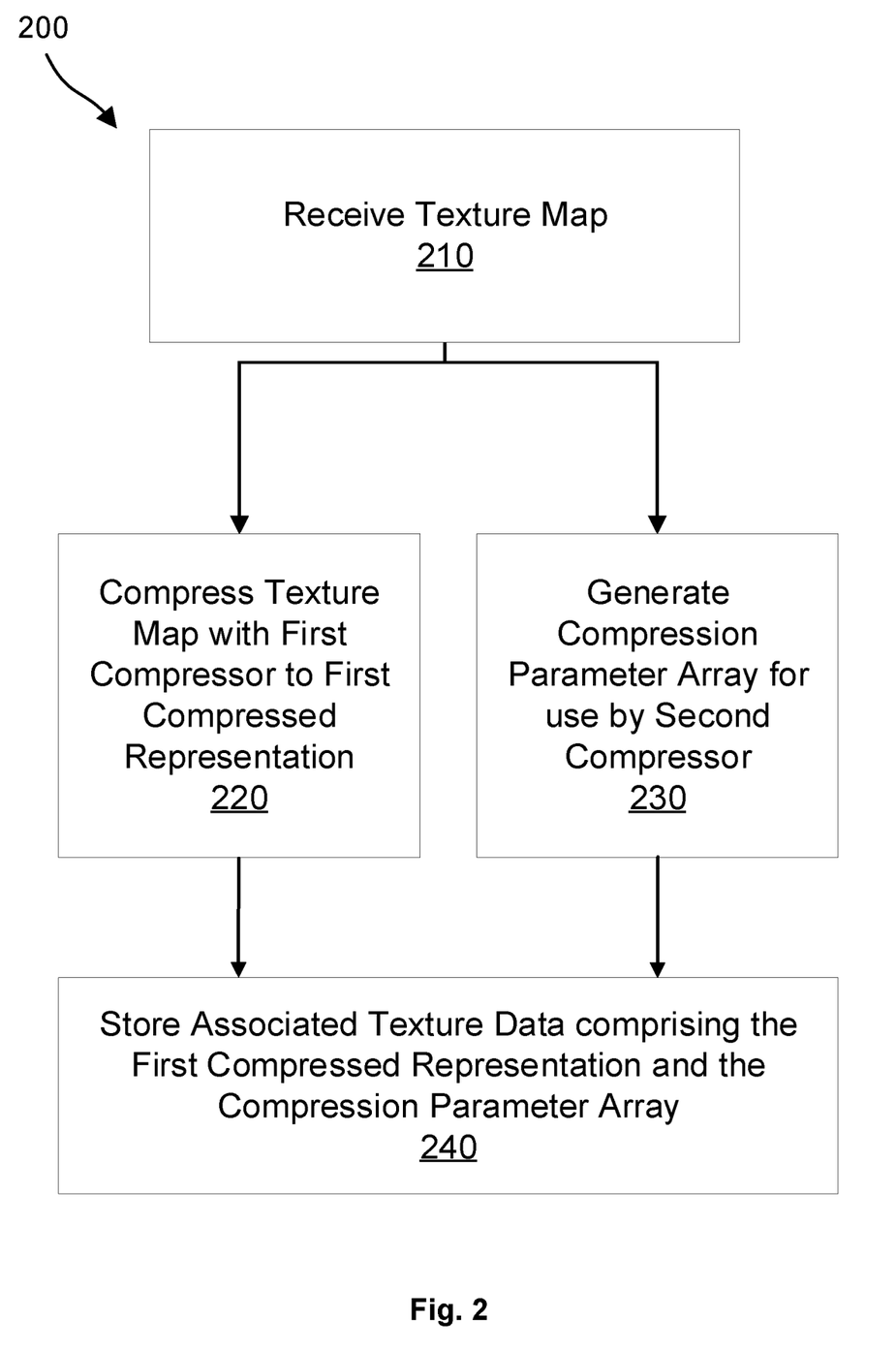
FIG. 2 is a flow diagram of an example method for generating and storing associated texture data representing a texture map.

FIG. 2 is a flow diagram of an example method by which associated texture data is generated and stored. The method is performed by executing computer-readable instructions using one or more processors of one or more computing devices. In some embodiments, the one or more computing devices are the compression server 120. In other embodiments, the one or more computing device are a subset of the devices of the storage system 100.

Figure 3:
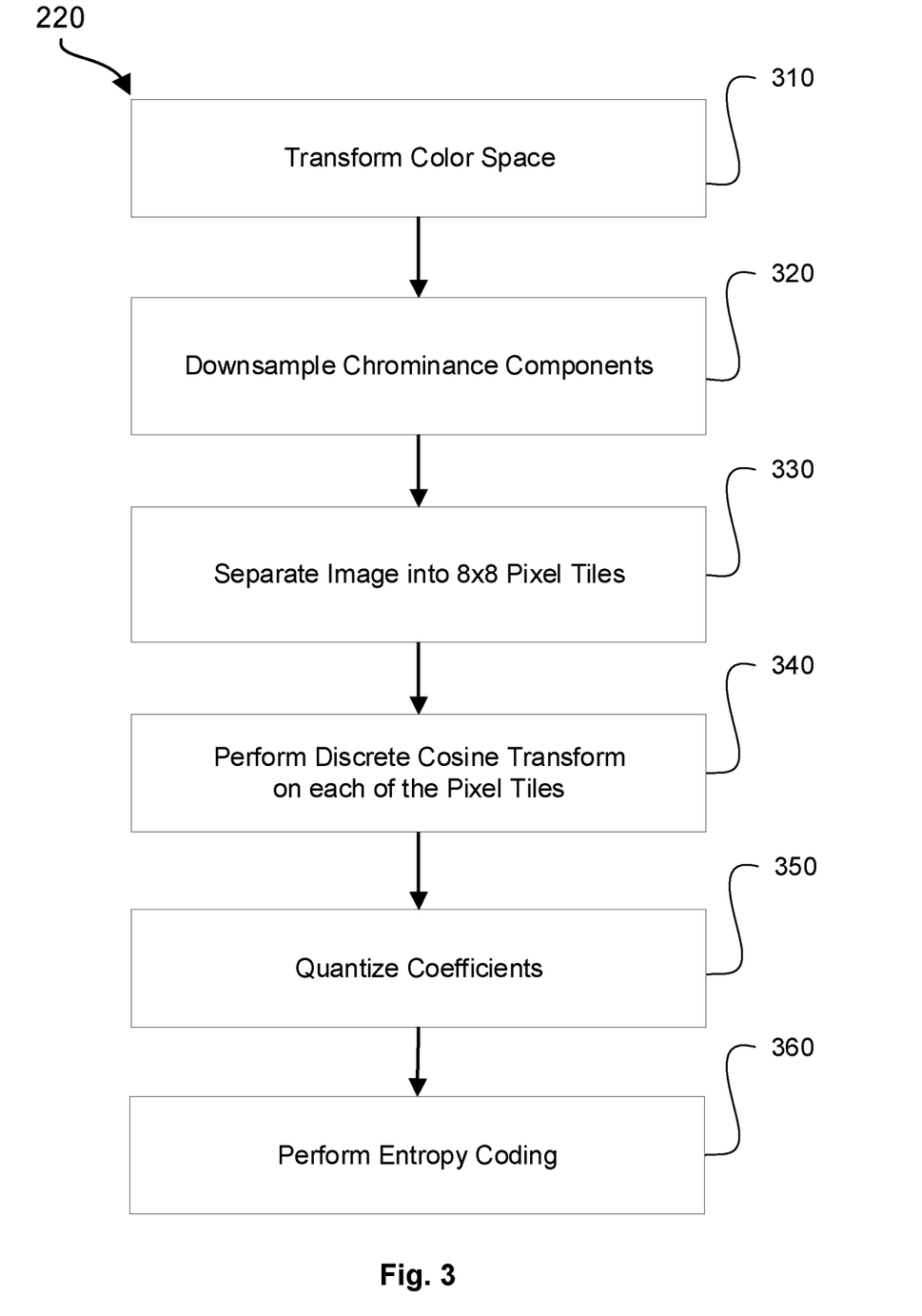
FIG. 3 is a flow diagram of an example method for compressing images.

In step 210, a texture map is received. The received texture map may be in any suitable format. For maximal quality, the texture map is typically in an uncompressed or losslessly compressed format, e.g. PNG or TIFF. If necessary, preliminary processing is performed on the texture map to obtain raw pixel data for the texture map. For instance, if the texture map has been received in a compressed form, it is decompressed. Furthermore, if the texture map contains any extraneous data, this is also removed In step 220, the raw pixel data of the texture map is compressed with a first compressor, e.g. a conventional image compressor, to a first compressed representation, e.g. JPEG or JPEG-2000. Where a conventional image compressor is used to compress the image to JPEG or JPEG-2000, high compression ratios can be achieved with little human perceptible loss. These conventional image compressors achieve such high compression ratios by removing details unperceivable to humans and by performing variable-length coding to reduce entropy of the compressed representation. An exemplary implementation of a compression method for compressing raw pixel data to JPEG is illustrated in FIG. 3. However, the first compressor may comprise any suitable variable bit-rate compressor, for example a variable bit-rate compressor which uses perceptual scoring such as JPEG2000. For texture data that is not directly presented to users, but instead represents values used in rendering equations (e.g. normal or specular maps used to calculate lighting results), the first compressor may use a scoring methodology other than perceptual scoring. For diffuse (aka. albedo or color) textures, perceptual scoring is preferable.

In step 230, which may be performed in parallel with, before or sequential to step 220, an array of compression parameters for use by a second compressor, e.g. a block texture compressor, is generated for the raw pixel data of the texture map. To produce the array of compression parameters, the raw pixel data is segmented in to pixel regions, e.g. 4×4 blocks. For each of these pixel regions, one or more compression parameters are determined and included in the array of compression parameters. Each of the respective one or more compression parameters are usable by the second compressor to optimize compression of the respective pixel region in to a second compressed representation. The second compressed representation may be a modern texture block compression format, such as BC7, BC6H or ASTC. In such cases, the one or more compression parameters for each pixel region may include a compression mode and, optionally, partition bits. In the case of BC7, the one or more compression parameters may include rotation bits. More detail of how the respective compression parameters may be determined in the case of BC7 is provided in FIG. 4.

In step 240, associated texture data comprising the first compressed representation of the texture map and the array of compression parameters is stored. The first compressed representation of the texture map and the array of compression parameters may be associated in any of a variety of ways. For instance, the first compressed representation of the texture map 132 and the array of compression parameters may be combined in the same archive file, e.g. a TAR or ZIP file, or simply be located in the same folder. Alternatively, an association between them may be stored in a suitably structured file or database where each row contains a reference to a pixel region of the first compressed representation of the texture map, and a reference to the one or more compression parameters for that pixel region in the compression parameter array. This associated texture data may be stored to any suitable storage media. Examples of suitable storage media include hard disc drives, solid state drives, optical discs, game cartridges and flash memory cards.

Image Compression Method

FIG. 3 is a flow diagram of an example method by which an image, such as a texture map, may be compressed to a JPEG file using a first compressor. This is intended as an example and other methods and compressors may be used instead, e.g. a method and corresponding compressor that compresses to JPEG-2000. The method is performed by executing computer-readable instructions using one or more processors of one or more computing devices. In some embodiments, the one or more computing devices are the compression server 120. In other embodiments, the one or more computing devices are a subset of the devices of the storage system 100.

In step 310, the color space of the raw pixel data of the image is transformed. In the original color space, each pixel of the raw pixel data has red, green and blue components, so is said to be in the RGB color space. Each of these pixels is converted into a color space know as Y'CBCR. In this color space, each pixel has a luminance component, Y', a blue chrominance component, CB, and a red chrominance component, CR. The luminance is the brightness of the pixel. The chrominance components provide a way by which the color information of the pixel can be conveyed separately to its brightness.

In step 320, the chrominance component is downsampled, i.e. its resolution is reduced. In JPEG, it is most commonly downsampled by a factor of two in each of the horizontal and vertical directions. Thus, the resolution of these components is decreased four-fold. Hence, the amount of data used to store these components is also reduced four-fold. This is done as the human eye is able to distinguish considerably finer detail in brightness than in color. Therefore, downsampling the chrominance components, has a minimal impact on the perceived quality of the image.

In step 330, the transformed, downsampled pixel data is split in to 8×8 tiles. The pixel data is split in to these tiles for subsequent processing by the compressor.

In step 340, a discrete cosine transform (DCT) is performed on each of the components of each of the pixel tiles. In order to do so, each component of each pixel tile is first shifted to a range centred on zero. This step reduces the dynamic range that the DCT needs to support. Performing the discrete cosine transform is a conversion from the space domain to the spatial frequency domain. The output from the transformation of a given component of a given tile is, therefore, a matrix of coefficients representing it in the frequency domain.

In step 350, each of the transformed components of the transformed tiles is quantized. Quantization involves reducing the precision of high frequency coefficients of the transformed tiles. Quantization achieves this by dividing each frequency coefficient in a transformed tile by a constant and then rounding it to the nearest integer. The precision of high frequency coefficients is reduced because they do not significantly affect the perceived quality of the image. The human eye can recognize small differences in brightness over a large area, i.e. low frequency coefficients, but struggles to distinguish rapid changes between close pixels, i.e. high-frequency coefficients.

In step 360, entropy coding is performed on the quantized tiles. First run-length encoding is performed. This is a simple scheme where repetitions of the same symbol, in this case the frequency coefficient, are represented using the symbol and its count rather than simply repeating the symbol. For instance, JJJJJ would be represented as J5. Huffman coding is then applied to the result. The principle of Huffman coding is to use fewer bits to represent more commonly encountered symbols, e.g. numbers or characters, and more bits to represent less frequently encountered ones. In this way, the overall number of bits used to represent a given sequence of symbols can be reduced substantially. In the context of the quantized tiles, Huffman coding can be applied to the quantized frequency components. As certain values are common after quantization, e.g. zero for higher frequencies, using fewer bits to represent these values can substantially reduce the data used to represent the quantized tiles. Both Huffman coding and run-length coding are instances of variable-length entropy codes. As such, the result of this process, i.e. a JPEG file, is not suitable for selective access to a given pixel and/or portion of the file, as it is not possible to easily determine where any given pixel is located in the file. For these reasons, it is usually necessary to decompress JPEGs as a unit or sequentially.

Other image compression schemes, such as JPEG-2000, may include some of the same concepts as the method of FIG. 3. For instance, JPEG-2000, transforms the color space, splits the image into tiles, performs a discrete wavelet transform (which is related to the discrete cosine transform), quantizes the resultant coefficients and performs a (different) variant of entropy coding on the result.

Compression Parameter Generation Method

Figure 4:
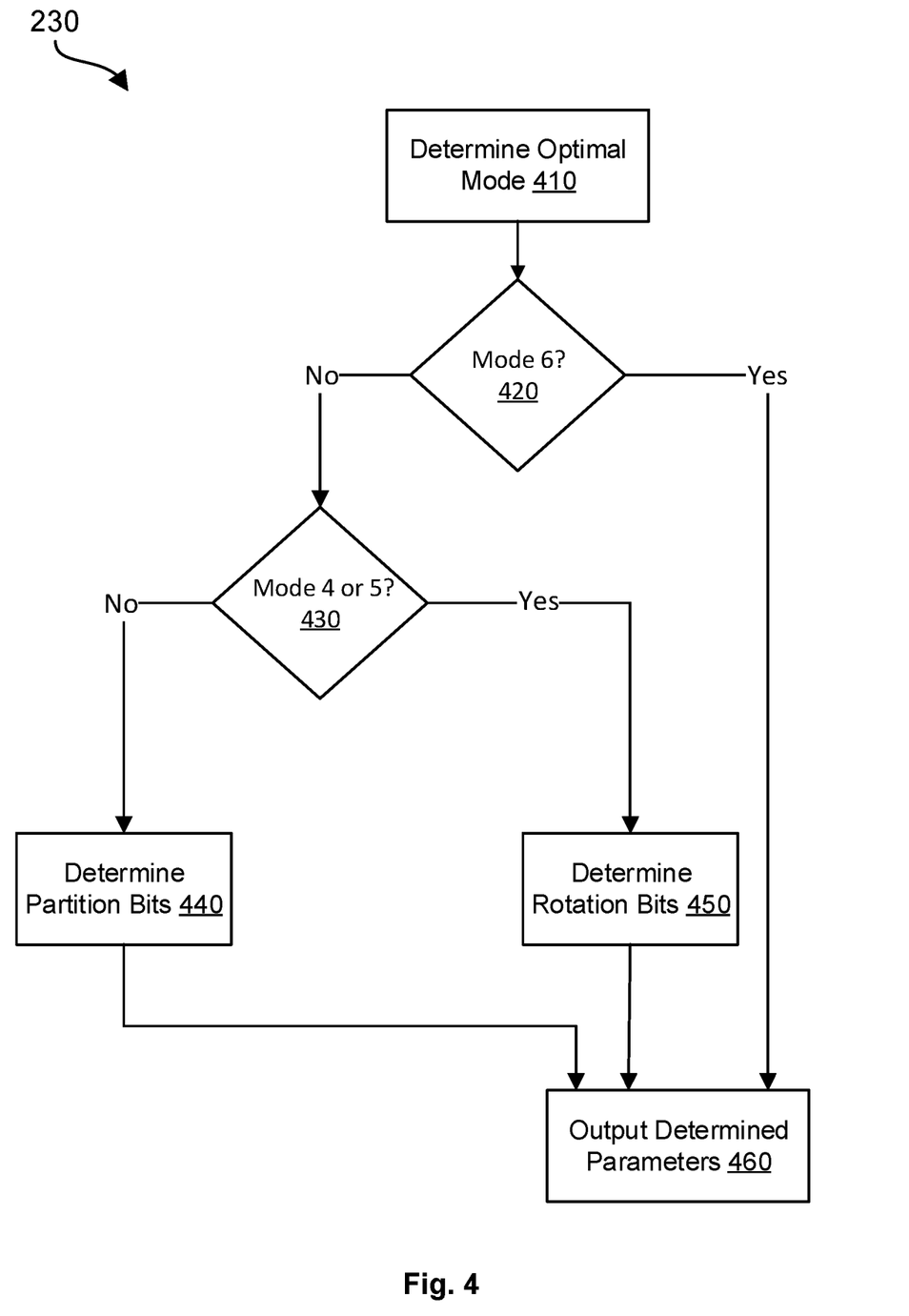
FIG. 4 is a flow diagram of an example method for generating compression parameters for a pixel region of a texture map.

FIG. 4 is a flow diagram illustrating an example method by which compression parameters for each pixel region of a texture map can be generated. This is intended as an example and other methods and compressors may be used instead. The method is performed by executing computer-readable instructions using one or more processors of one or more computing devices of the storage system 100. In some embodiments, the method for generating the compression parameters may be that used in BC7 or BC6H compressors. However, in conventional BC7 or BC6H compressors, parameters are generated as part of the compression process. In contrast, in embodiments of the claimed invention, the compressed parameters are determined in advance, separately from the compression process itself.

Methods for determining compression parameters, such as that illustrated, allow for a wide range of modes and mode-specific parameters that effectively change the bitwise encoding scheme used for compressing each pixel region. These parameters are encoded within each compressed block. By enabling a wide range of different parameters to be used, it is possible to effectively select the bitwise encoding scheme most appropriate for the contents of a given texture block. On the other hand, determining the optimal mode (e.g. the mode that results in the lowest compression error) may in some cases involve a significant amount of brute-force searching.

In step 410, the optimal compression mode for the pixel region is determined. BC7 has eight different modes, referred to as modes 0 to 7. Each of these modes is adapted to blocks having differing content, such that they can all be compressed to a 16-byte representation while maintaining as high a quality as is possible. For instance, some blocks may have alpha, i.e. transparency, components while others may have no alpha component. In the first case, a compression mode that contains alpha information is used. In the second case, a mode that uses these bits to encode the color information with greater precision can be used. In some instances, it may be desirable to use a number of colors from discontinuous color ranges, also referred to as color lines. In these cases, color information is encoded to allow a greater number of discontinuous color ranges, also referred to as color lines, but the precision with which colors along each color line can be encoded is correspondingly reduced. Where multiple color ranges are not needed, e.g. in the case of a smooth gradient, a mode having a single color range can be used and the bits that were used to encode the multiple ranges can be used to more precisely encode colors along this color line.

The optimal mode for a given block may be determined by compressing the block to a compressed representation using the second compressor according to all of a number of suitable compression modes, e.g. all modes having an alpha component, and determining which of these results in the smallest error. The error may be defined as the difference between the pixels of the original block and those represented by compressed representation. The error may be determined by decompressing to a decompressed pixel block and comparing this decompressed texture block to the original texture block.

In the method described above, the optimal mode is determined by attempting each of a number of options and analysing which is best according to a given criteria is referred to as brute-force searching. Optimisation methods which include a brute-force search, such as that described, often select an optimal or near optimal result but are very computationally expensive.

In step 420, it is checked whether the determined optimal mode is mode 6. If the determined optimal mode is not mode 6, execution passes to step 430 where a further check is performed. If the determined optimal mode is mode 6, execution passes to operation 460 where the determined parameters, i.e. the mode in this case, are outputted.

In step 430, it is checked whether the determined optimal mode is either of mode 4 or 5. If the determined optimal mode is not mode 4 or 5, i.e. is any of modes 0-3 or 7, execution passes to step 440 where partition bits are determined. If the determined optimal mode is mode 4 or 5, execution passes to step 450 where rotation bits are determined.

In step 440, partition bits for the pixel region are determined. Partition bits are used for these compression modes as, in these compression modes, the colors of different pixels are taken from different color ranges, i.e. color lines. The partition bits define the subsets of pixels having colors from each line. With this defined, each pixel can be represented by its position on the given color line, and which color line should be used need not be indicated for each individual pixel. Depending on the mode, the partition bits either define two distinct subsets, where colors are taken from two color lines, or three distinct subsets where colors are taken from three color lines. As a small number of partition bits are used, four or six depending on the mode, the partition bits are limited to defining the most frequently observed partitionings. In the case that four bits are used, the partition bits select from the 16 most common partitions. In the case that six bits are used, the bits select from the 64 most common partitions. Examples of two subset partitions are illustrated in diagram 510 of FIG. 5. Examples of three subset partitions are illustrated in diagram 520 of FIG. 5.

In step 450, rotation bits are determined. Counterintuitively, the rotation bits do not refer to rotating the block but instead refer to swapping components. Modes 4 or 5 have an alpha range and three component ranges, i.e. red, green and blue ranges, defined. Without rotation, in these modes, the endpoints of the alpha range are represented with more precision. The rotation bits allow the bits used to represent the endpoints of the alpha range to be 'swapped' with those representing the endpoints of one of the component ranges. If such a rotation is performed, the alpha endpoints are represented with less precision and the endpoints of the chosen component are represented with more precision.

In step 460, the one or more compression parameters determined for the pixel region are outputted. In the case of mode 6, the one or more compression parameters are at least the mode. In the case of modes 4 and 5, they comprise the mode and rotation bits. In the case of the other modes, they comprise the mode and partition bits.

While, for the sake of clarity, the steps of this process have been described as sequential, it should be noted that these steps may be interleaved. For instance, as part of determining the error for each mode, the optimal partition bits or rotation bits for that mode may be determined. This error is then used to determine which of these modes is optimal.

Subset Partitions

Figure 5:
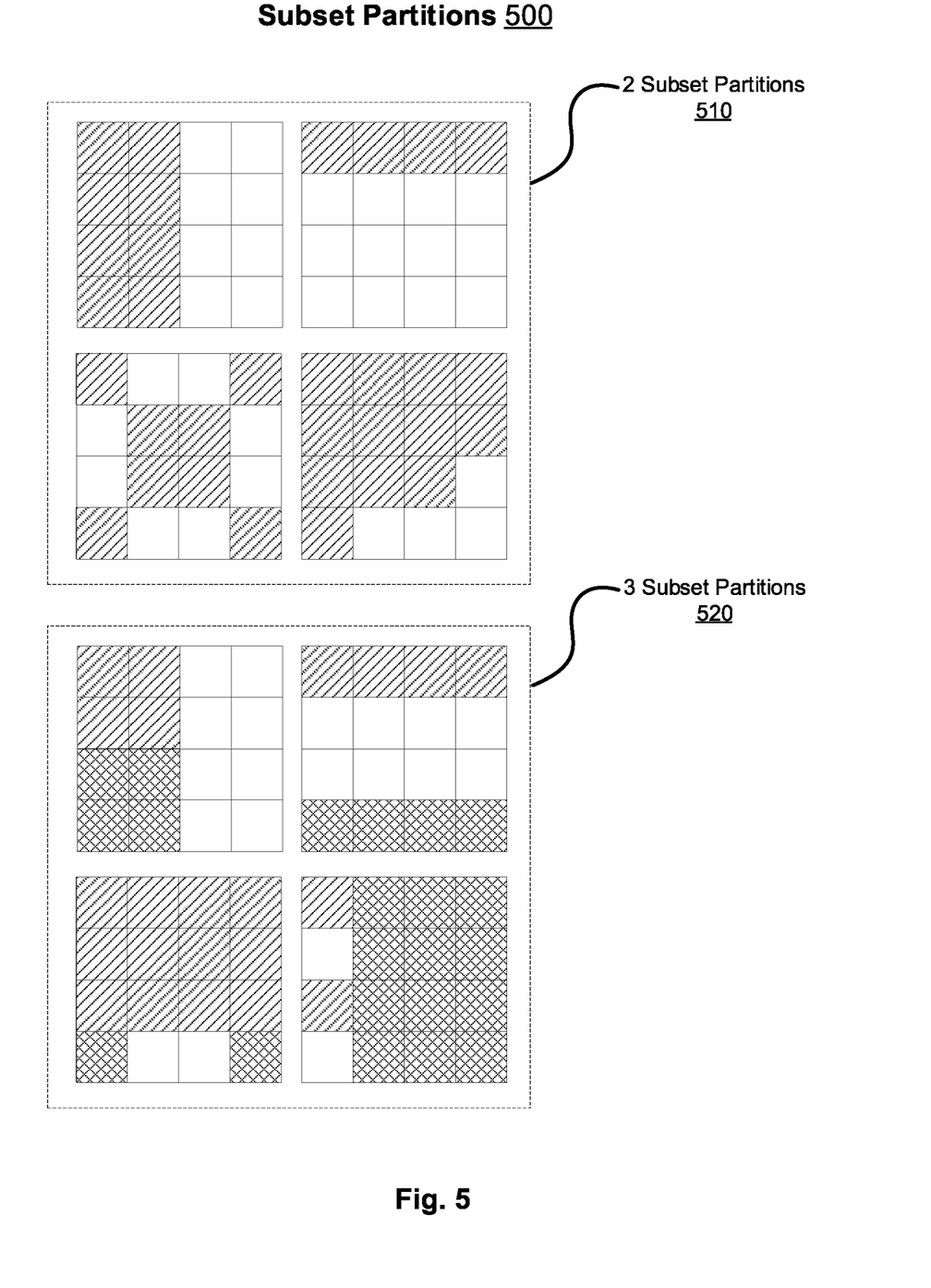
FIG. 5 is an illustration of exemplary BC7 partitions.

FIG. 5 is a diagram 500 illustrating a number of BC7 partitions for modes using six partition bits.

The two subset partition diagram 510 shows four of the 64 available two subset partitions. Each of the squares in the diagram corresponds to a pixel in a compressed block. The color of each pixel illustrated as diagonally hatched is defined with respect to a first color range, and the pixels illustrated as white are defined with respect to a second color range.

The three subset partition diagram 520 shows four of the 64 available three subset partitions. Each of the squares in the diagram corresponds to a pixel in a compressed block. The color of each pixel illustrated as diagonally hatched is defined with respect to a first color range, the pixels illustrated as white are defined with respect to a second color range, and the pixels illustrated as cross hatched are defined with respect to a third color range.

Rendering System

Figure 6:
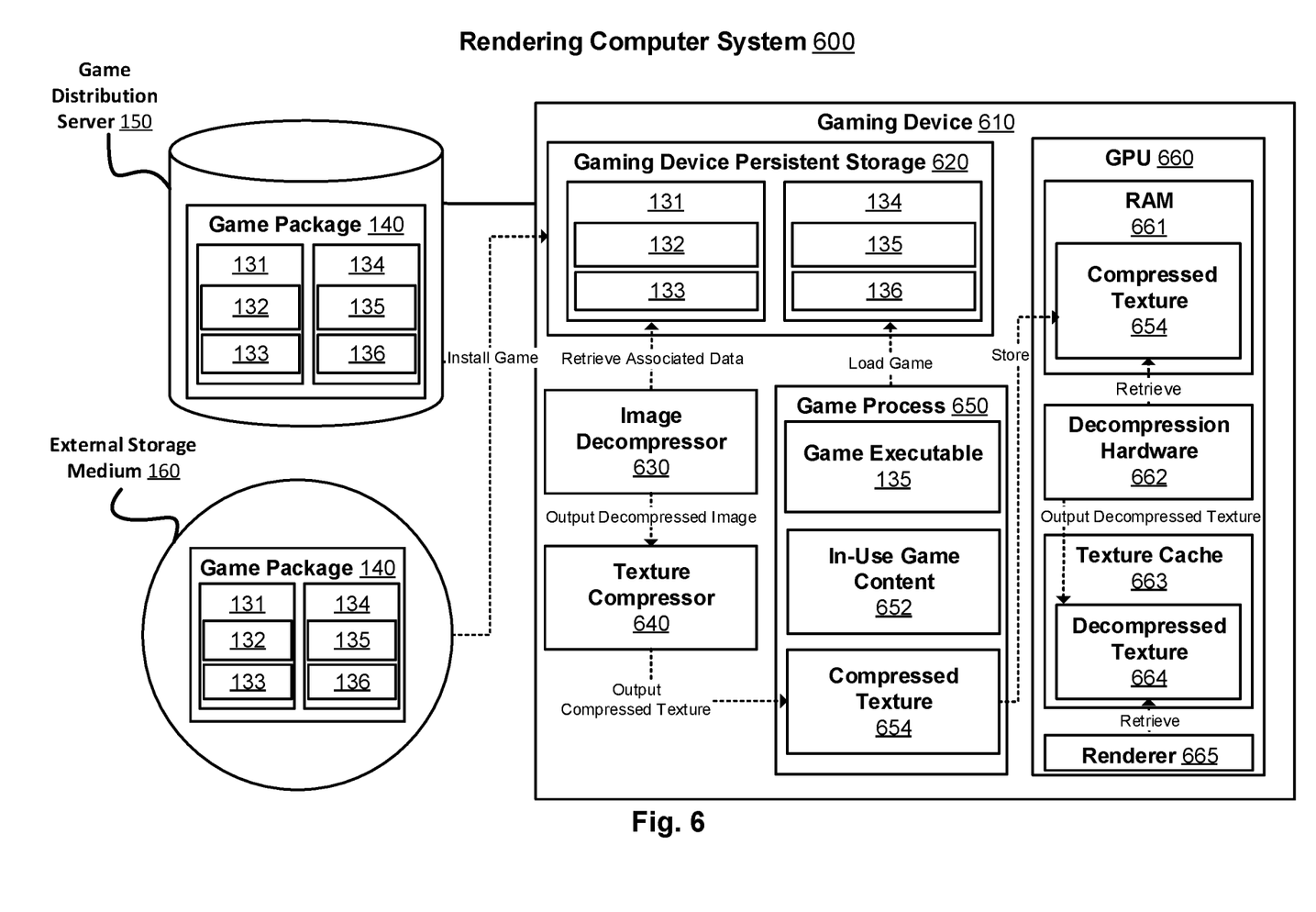
FIG. 6 is a schematic block diagram illustrating an example of a computer system configured to efficiently render textures using the associated texture data.

Referring to FIG. 6, a retrieval and rendering system 600 for retrieving and rendering portions of associated texture data representing a texture map is shown.

The retrieval and rendering system 600 includes a gaming device 610, and either or both of the previously described game distribution server 150 and external storage medium 160. If present, the game distribution server 150 is configured to communicate with the gaming device 610 over a network. Examples of suitable networks include the internet, intranets, local area networks, wireless networks and cellular networks. Similarly, if present, the external storage medium 160 is configured to be read via a peripheral interface of the gaming device 610.

The gaming device 610 can be any computing device suitable for rendering graphics using a texture map from the associated texture data. For example, the gaming device 610 may be any of a laptop computer, desktop computer, a games console, a tablet computer or a smartphone. For displaying the rendered graphics to a user of the gaming device (e.g. a video game player), the client computing device 610 includes or is connected to a display (not shown). Input device(s) (not shown) are also included or connected to the client. Examples of suitable input devices include games controllers, mice and keyboards.

The gaming device 610 uses the game distribution server 150 and/or external storage medium 160 to install the game from the game package 140 to its persistent storage 620. The game is installed to the persistent storage 620 using any suitable process. For instance, where the game package 140 is an installer, the game may be installed using the installer which is configured for the given gaming platform. Where the game package is a compressed archive, installing the game may involve transferring the compressed archive to the persistent storage and decompressing this transferred archive on the gaming device. It should be noted that while in some embodiments, the game is installed to persistent storage 620, in some embodiments, the game may be streamed from the game distribution server 150 or run from the external storage medium 160.

When the game requests a texture map represented by the associated texture data 131, the compressed image 132 representing the texture map is retrieved and decompressed by an image decompressor 630. The image decompressor 630 may for instance be a high-speed JPEG decompressor that operates via steps performing transformations reversing those performed during compression according to a method such as that illustrated in FIG. 3. Alternatively, the image decompressor 630 may be a high-speed JPEG-2000 decompressor. The image decompressor 630 may use one or more conventional processors, one or more GPUs or both to decompress the compressed image. The result of the decompression is raw pixel data of the texture map. It should be noted that, due to compression artefacts, this raw pixel data may differ slightly from that of the texture map prior to compression.

The pixels of the decompressed image are transferred to a texture compressor 640 along with the associated array of compression parameters 133. The texture compressor uses the one or more compression parameters for each corresponding pixel region to compress the corresponding pixel region to a texture compression format, such as a texture block compression format, where each region is compressed to a fixed number of bits. The result of applying this to each of the pixel regions is a compressed representation of the texture map in a texture compression format 654, herein referred to as the compressed texture 654. The compressed texture 654 is output to the game process 650.

The compression operations performed by the texture compressor 640 may include determining the endpoints of one or more colour ranges, i.e. colour lines, represented in the pixel block and determining the indices, which indicate a colour along one of these color lines, for each pixel in the block.

The game process 650 is an instance of the game loaded from the persistent storage 620 into memory, and actively being executed by one or more processors of the gaming device 610. The game process 650 includes the game executable 135 previously described. The game process 650 also includes in-use game content. This in-use game content 652 is a portion of the other game content 136 that is being used, or has been cached into main memory, by the game.

When one or more instructions of the game executable 135 requiring a portion of the texture map to be used for rendering is executed, the compressed texture 654 is loaded into the RAM 661 of the GPU 660 so that the GPU 660 can perform the requested rendering. It should be noted that the compressed texture 654 is significantly smaller than the uncompressed representation but is larger than the compressed image 132, since each of the regions of the texture map is compressed to a fixed number of bits.

The GPU 661 may use specialized decompression hardware 662 to retrieve the portion of the compressed texture 654 and decompress it in to raw pixel data usable for rendering. The GPU may use small portions of the texture map for rendering at any time. However as described above, the compressed texture 654 is adapted for selective access so that selected portions of the compressed texture may be loaded in to the decompression hardware 662. The decompression hardware 662 may comprise an application-specific integrated circuit adapted for performing texture decompression. The decompressed portion of the texture may be output by the decompression hardware 662 and stored in the texture cache 664.

The decompressed texture 664 stored in the texture cache 663 is then used by the renderer of the GPU 665 to render a 3D scene and output it to, for example, a display connected to the gaming device 610. Operations performed during rendering may include vertex shading, geometry shading, triangle rasterization, pixel shading, and raytracing. At least pixel shading operations may use the decompressed texture.

Texture Retrieval Method

Figure 7:
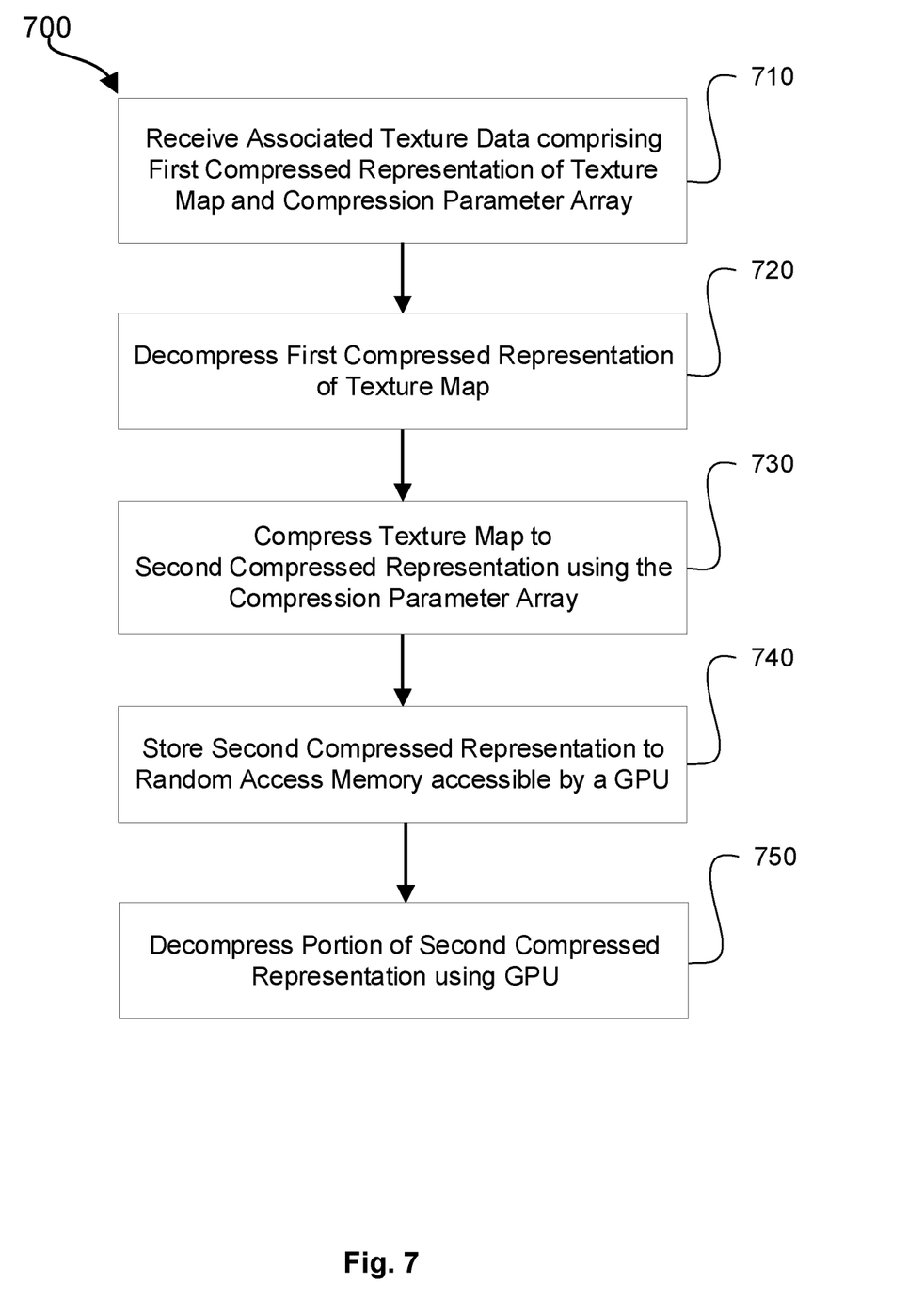
FIG. 7 is a flow diagram of an example method for efficiently obtaining portions of the texture map with a GPU using the associated texture data.

FIG. 7 is a flow diagram of an example method by which portions of a texture map represented as associated texture data can be rendered. The method may be performed by executing computer-readable instructions using one or more processors of one or more computing devices of the retrieval and rendering system 600.

In step 710, associated texture data comprising a first compressed representation of a texture map, compressed using a first compressor, and a compression parameter array, for use by a second compressor are received. The associated texture data may comprise the associated texture data 131 of FIG. 1 and FIG. 6 and/or may be the associated texture data referred to in method 200. For example, the first compressed representation of the texture map may be a JPEG or JPEG-2000 file, and the compression parameter array may be an array of parameters for a modern texture block compressor, such as a BC7 or BC6H compressor.

In step 720, the first compressed representation of the texture map is decompressed to raw pixel data. The decompression may be performed by a high-speed JPEG decompressor that operates via steps performing transformations which may reverse those performed during compression. Alternatively, the decompression may be performed by a high-speed JPEG-2000 decompressor. The decompression may be performed using one or more conventional processors, and on one or more GPUs.

In step 730, the texture map is compressed to a second compressed representation using the compression parameter array. Each of the one or more compression parameters in the compression parameter array is used to compress the corresponding pixel region to a second compressed representation, such as a texture block compression format, where each region is compressed to a fixed number of bits. The texture block compression format may be BC7 or BC6H.

Where the second compressed representation is a texture block compression format, the compression to the second compressed representation may include determining the endpoints of one or more colour ranges, i.e. colour lines, represented in the pixel block and determining the indices, which indicate a color along one of these color lines, for each pixel in the block.

In step 740, the second compressed representation is stored in random access memory accessible by a GPU. Data may be transferred to the random access memory via a bus of the computing device between main memory and a random access memory of the GPU. In other embodiments, step 730 is performed by the GPU so the second compressed representation may be stored directly to the random access memory of the GPU. In instances where an integrated GPU is used, the random access memory accessible by the GPU is a portion of main memory and so the GPU may read the compressed representation from main memory.

In step 750, a portion of the second compressed representation is decompressed by the GPU in to raw pixel data. The decompression is typically performed using a specialized component of the GPU configured to perform texture compression. Only small portions of the texture map are typically required for rendering at any time. The second compressed representation of the texture map is typically a format suited to selective access, such as BC7 or BC6H. The portions of the texture map required can, therefore, be compressed without substantially requiring decompression of the remainder of the texture map.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method comprising:
receiving a texture map including a plurality of pixel regions, wherein the texture map is in a received format;
compressing the texture map from the received format into a first compression format, wherein the texture map is compressed from the received format into a compressed representation in the first compression format using a first compressor;
generating an array of compression parameters for compressing the texture map from the received format into a second compression format using a second compressor, comprising
determining, for each of the plurality of pixel regions of the texture map in the received format, one or more respective compression parameters which optimize compression of the pixel region into a compressed representation in the second compression format using the second compressor, and
storing the compressed representation in the first compression format in association with the array of compression parameters for the second compressor.

2. The computer-implemented method of claim 1, wherein compressing the texture map using the first compressor comprises performing variable-length coding to reduce the entropy of the compressed representation in the first compression format.

3. The computer-implemented method of claim 1, wherein compressing the texture map to the compressed representation in the first compression format comprises transforming the texture map into the frequency domain.

4. The computer-implemented method of claim 1, wherein, in the second compression format, each pixel region is represented using the same number of bits.

5. The computer-implemented method of claim 1, wherein the pixel regions are fixed-size square blocks of pixels.

6. The computer-implemented method of claim 1, wherein the second compression format is BC7 or BC6H.

7. The computer-implemented method of claim 1, wherein each of the one or more compression parameters comprises a compression mode.

8. The computer-implemented method of claim 1, wherein at least one of the one or more compression parameters comprises partition bits, wherein the partition bits define subsets of the corresponding pixel region.

9. An apparatus comprising:
at least one processor; and
at least one memory including computer program code which, when executed by the at least one processor, causes the apparatus to:
receive a texture map including a plurality of pixel regions, wherein the texture map is in a received format;
compress the texture map from the received format into a first compression format, wherein the texture map is compressed from the received format into a compressed representation in the first compression format using a first compressor;
generate an array of compression parameters for compressing the texture map from the received format into a second compression format using a second compressor, comprising determining, for each of the plurality of pixel regions of the texture map in the received format, one or more respective compression parameters which optimize compression of the pixel region into a compressed representation in the second compression format using the second compressor; and
store the compressed representation in the first compression format in association with the array of compression parameters for the second compressor.

10. The apparatus of claim 9, wherein compressing the texture map using the first compressor comprises performing variable-length coding to reduce the entropy of the compressed representation in the first compression format.

11. The apparatus of claim 9, wherein compressing the texture map to the compressed representation in the first compression format comprises transforming the texture map in to the frequency domain.

12. The apparatus of claim 9, wherein, in the second compression format, each pixel region is represented using the same number of bits.

13. The apparatus of claim 9, wherein the pixel regions are fixed-size square blocks of pixels.

14. The apparatus of claim 9, wherein the second compression format is BC7 or BC6H.

15. The apparatus of claim 9, wherein each of the one or more compression parameters comprises a compression mode.

16. The apparatus of claim 9, wherein at least one of the one or more compression parameters comprises partition bits, wherein the partition bits define subsets of the corresponding pixel region.

17. A non-transitory computer readable storage medium storing computer program code that, when executed by a processing device, causes the processing device to perform operations comprising:
receiving a texture map including a plurality of pixel regions, wherein the texture map is in a received format;
compressing the texture map from the received format into a first compression format, wherein the texture map is compressed from the received format into a compressed representation in the first compression format using a first compressor;
generating an array of compression parameters for compressing the texture map from the received format into a second compression format using a second compressor, comprising determining, for each of the plurality of pixel regions of the texture map in the received format, one or more respective compression parameters which optimize compression of the pixel region into a compressed representation in the second compression format using the second compressor; and
storing the compressed representation in the first compression format in association with the array of compression parameters for the second compressor.

18. The apparatus of claim 17, wherein compressing the texture map using the first compressor comprises performing variable-length coding to reduce the entropy of the compressed representation in the first compression format.

19. The apparatus of claim 17, wherein compressing the texture map to the compressed representation in the first compression format comprises transforming the texture map in to the frequency domain.

20. The apparatus of claim 17, wherein, in the second compression format, each pixel region is represented using the same number of bits.

* * * * *